Jan. 29, 1952　　　W. E. RIPPER　　　2,583,883
MEANS FOR AERIAL SPRAYING
Filed Jan. 18, 1947　　　　　　　　　　6 Sheets-Sheet 1
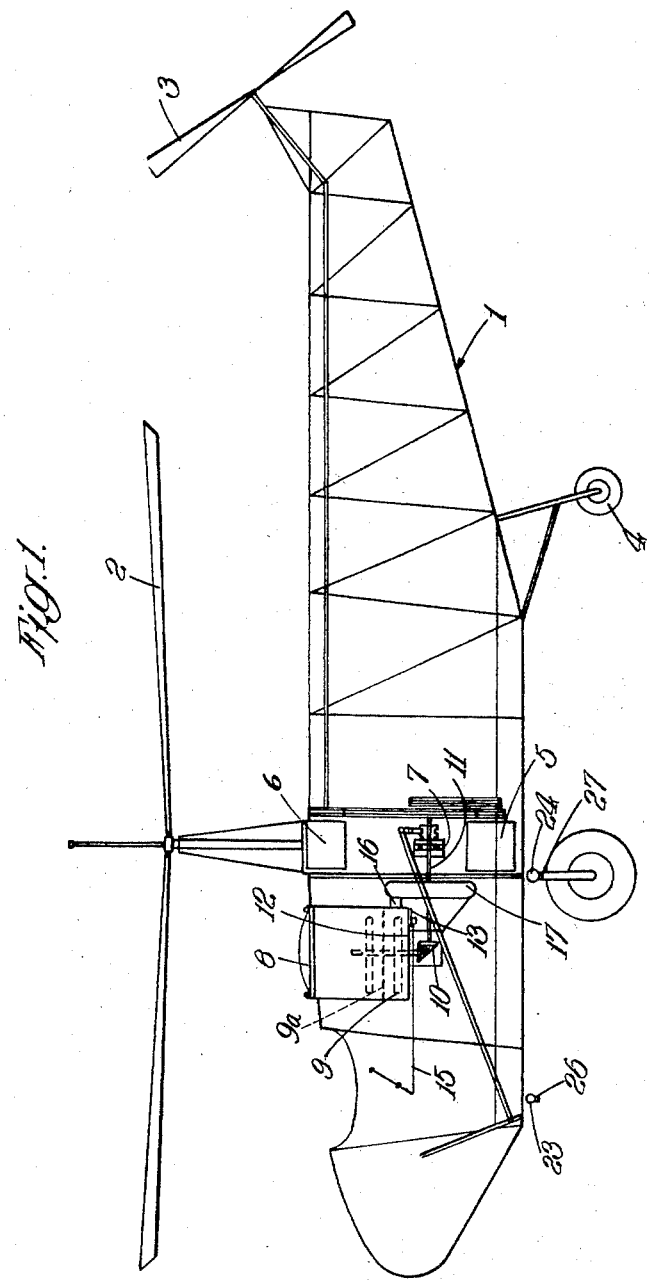

Jan. 29, 1952 W. E. RIPPER 2,583,883
MEANS FOR AERIAL SPRAYING
Filed Jan. 18, 1947 6 Sheets-Sheet 2
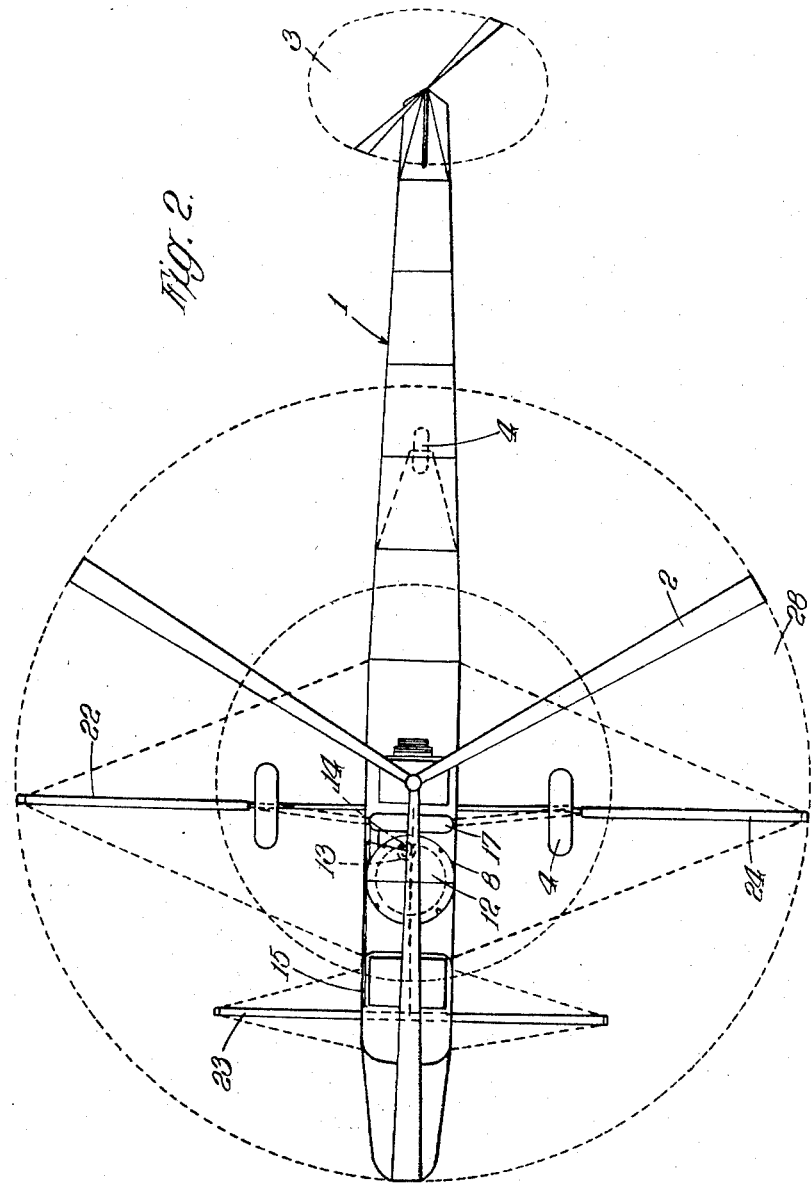

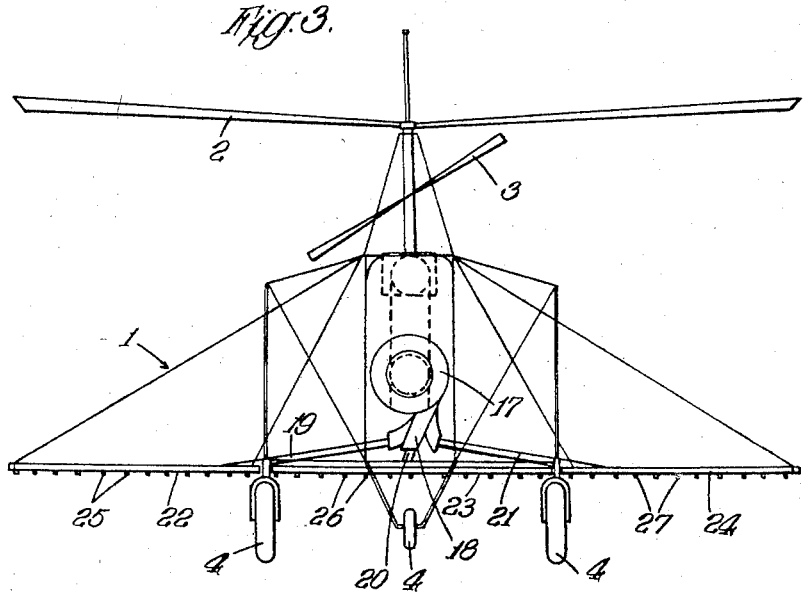
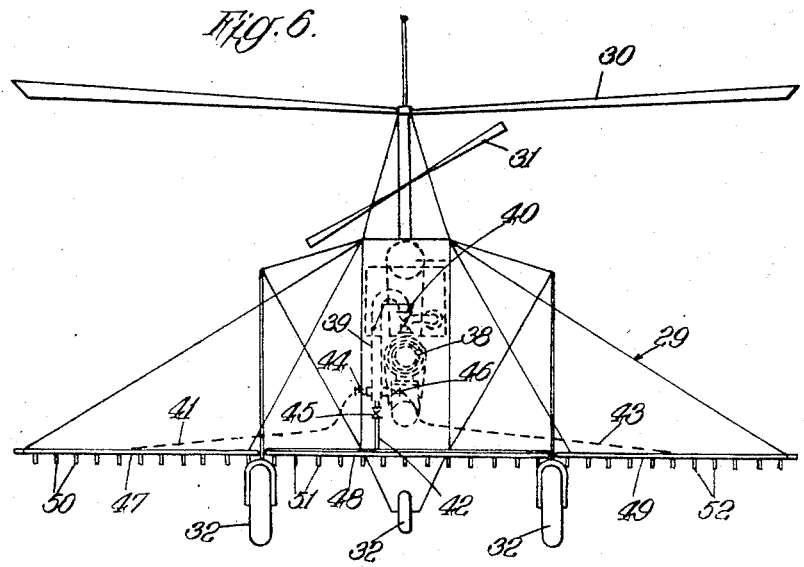

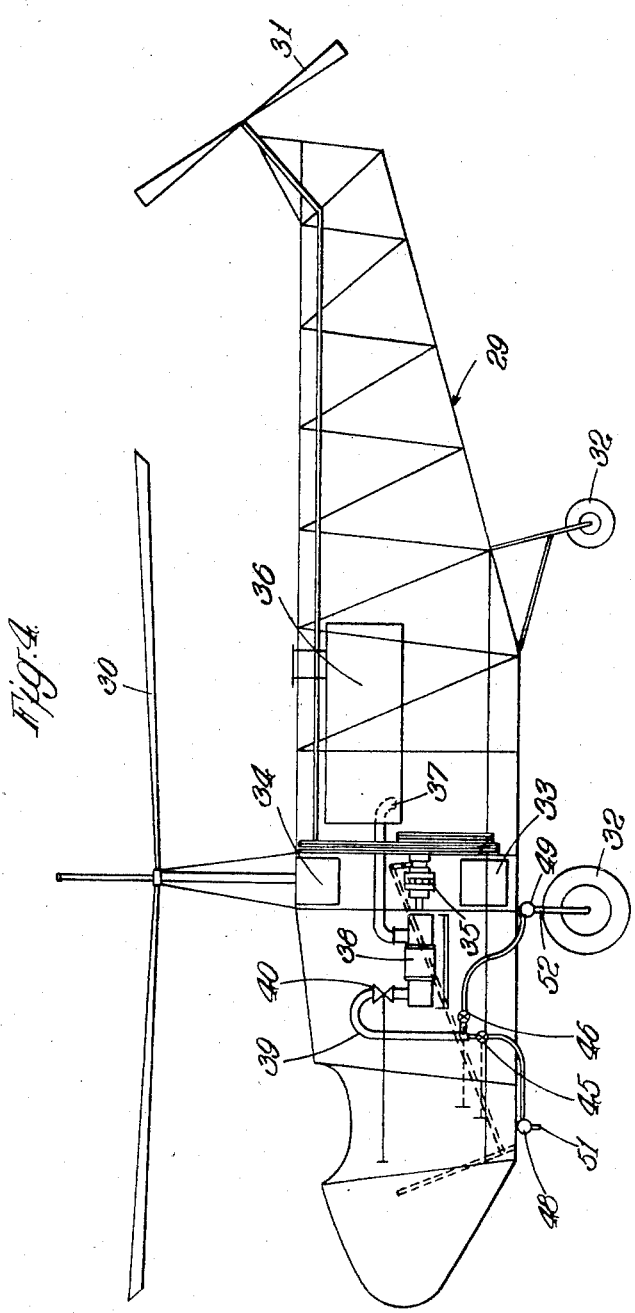

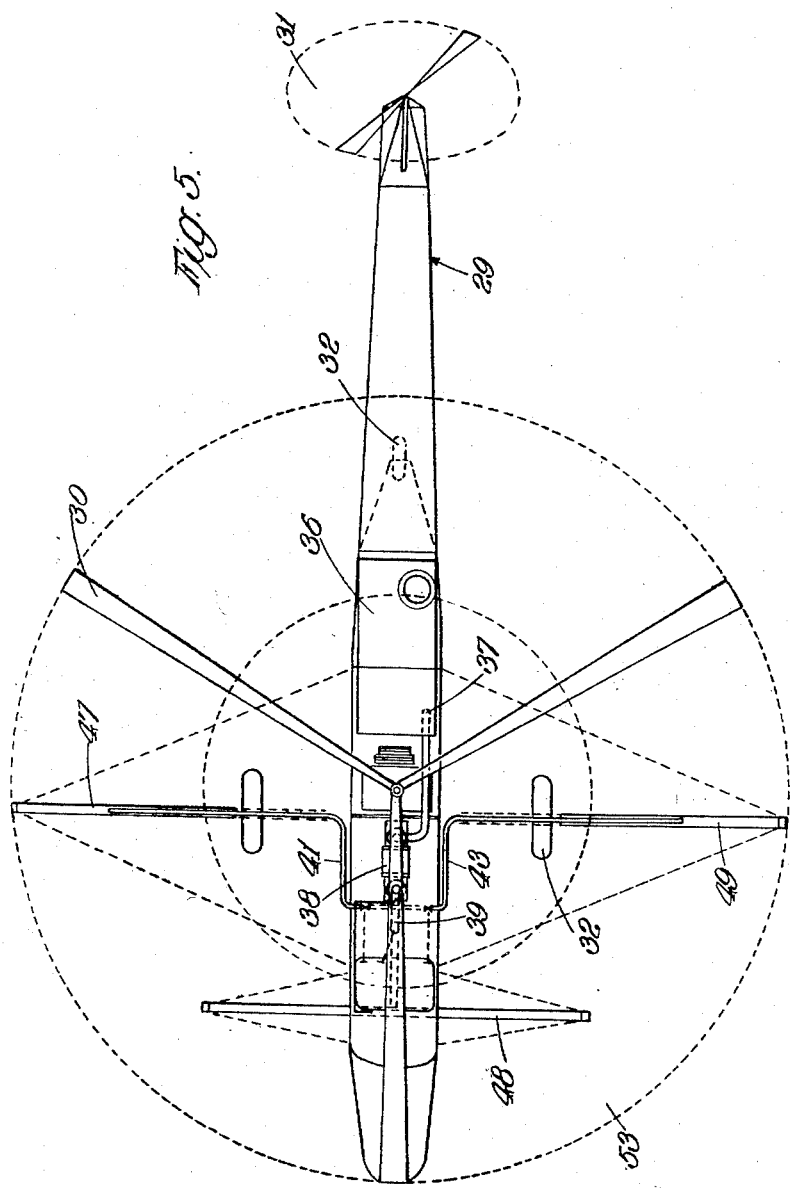

Jan. 29, 1952 W. E. RIPPER 2,583,883
MEANS FOR AERIAL SPRAYING
Filed Jan. 18, 1947

Inventor
WALTER EUGENE RIPPER

Patented Jan. 29, 1952

2,583,883

UNITED STATES PATENT OFFICE 2,583,883

MEANS FOR AERIAL SPRAYING

Walter Eugene Ripper, Ravenstone, Harston, England, assignor to Pest Control Limited, Harston, England, a British company Application January 18, 1947, Serial No. 722,945
In Great Britain April 8, 1943

Section 1, Public Law 690, August 8, 1946
Patent expires April 8, 1963

5 Claims. (Cl. 244—136)

This invention relates to an improvement in a method of and means for aerial spraying.

The use of aeroplanes for the treatment of crops with insecticides, fungicides and the like, has hitherto suffered the great disadvantage that the swath of chemicals in dust or spray form drifts considerable distances because the direction of the slip stream of an aeroplane is more or less parallel with the surface of the field. Thus an early settling of the aerosols is prevented and is very subject to lateral displacement by wind.

These long clouds of chemicals are not suitable for use on the comparatively small fields of British farms. In any case they render the operation very dependent on the condition of low wind velocity as a higher wind velocity deflects the cloud and so prevents it reaching its objective.

Attempts were made to overcome the disadvantage by using an autogyro but here again the forward speed is too great and the swath too long.

I have found that of all aircraft the helicopter is the nearest approach to an ideal machine for the carrying of a dusting or spraying device because it is the only aircraft with a slip stream whose angle of incidence with the surface of the earth is sufficiently large. This is due to the fact that the rotor causes a downward air stream or downwash which resembles a funnel shaped whirlwind in shape, having a hollow cone full of eddies surrounded by a strong downward current originating from the rotor. When the helicopter hovers this downwash hits the ground in a ring around the aircraft, but when the aircraft is moving at say 6 to 10 miles per hour this downwash still hits the ground at a steep angle, but behind the aircraft. The downwash confines the swath considerably and helps to overcome the cushioning effect of the air on the surface of the ground. According to the present invention chemicals are introduced into the downwash.

Further, the helicopter is capable of flying at reduced speed sufficiently low to be adaptable to British farming conditions. Its use does not require an aerodrome and enables a much more accurate dosage to be discharged on moderately sized fields.

When installing means for discharging dusts or liquids, difficulties are encountered which are not met with in other types of aircraft. At the very low forward speeds, the horizontal slip stream of the aircraft is not sufficient or is, at least, variable to disperse chemicals by the early type of spraying device used in aeroplanes or autogyros.

Accordingly, the present invention provides means for aerial spraying comprising a helicopter provided with a container for the liquid or dust to be sprayed, means for dispersing the liquid or dust, a dosage regulator and means for introducing the said liquid or dust into the downwash of the helicopter rotor to ensure the prevention of a long swath, so that the liquid or dust reaches the crop beneath the helicopter, whether directly under the helicopter, or slightly to the rear, the side or the front of the helicopter.

The present invention also includes a method of treating a crop with a spray medium which comprises dispersing said spray medium and introducing said dispersed spray medium into the rotor downwash of a helicopter flying over said crop, so that said spray medium reaches said crop beneath said helicopter.

The dosage regulator may be operatively connected to the forward control of the aircraft so as to meter the same quantity per unit area treated.

The dispersing means may be for example pumps, fans or rotating discs.

In spraying liquid preferably thick suspensions are used which are broken up in spray nozzles through which the liquid is forced out under pressure. The pressure is produced either by a pump or by a compressor forming an air cushion over the liquid. The nozzles are preferably arranged as fixtures on the under carriage of the helicopter or on a boom arranged in the downwash or discharging into the same.

Spray liquids may also be broken up by rotating discs or Venturi tubes whereby the dispersed chemicals are again discharged into the downwash.

A dosage regulator is essential because the helicopter is capable of so variable a forward speed and the spray operator requires to utilise this variation. Were not a satisfactory regulation of the dosage provided to produce a variation of delivery with the forward speed of the helicopter, a very uneven coverage would result. This dosage regulator is either operated manually in relation to the forward speed, or mechanically connected to the forward speed control, or forward speed registering instrument so as to meter the same quantity per unit area treated.

When dusting dry chemicals the particles are well aerated by an agitator and then metered by a conveyor screw or variable slot mechanism into a fan, from whence they are then fed into the downwash of the helicopter. The nozzles may be disposed in fixed positions on the under carriage of the helicopter or on booms extending or delivering into the downwash.

In the case of spraying liquids, the dosage regulators may be needle valves or like devices which are operated either in conjunction with the aircraft speedometer manually, or mechanically by a small air screw fitted on the lower front of the fuselage, this air screw being operated by the forward speed of the aircraft and shielded against the slip stream from the rotor. This air screw in turn operates the regulator.

Two embodiments of the invention will now be described by way of example with reference to the accompanying drawings in which:

Fig. 1 is a side elevation of a machine according to the invention suitable for distributing dust.

Fig. 2 is a top plan view of the machine shown in Fig. 1,

Fig. 3 is a front elevation of the machine shown in Fig. 1,

Fig. 4 is a side elevation of a second machine according to the invention suitable for spraying liquids, Fig. 5 is a top plan view of the machine shown in Fig. 4, Fig. 6 is a rear elevation of the machine shown in Fig. 4, Fig. 7 is a detail perspective view of the hopper shown in Fig. 1, seen from the opposite side, and Fig. 8 is a detail plan view showing a part of the bottom of the said hopper.

Referring to Figs. 1 to 3 of the drawings, the helicopter indicated generally by the reference numeral 1 is provided with a rotor 2, stabilising airscrew 3, landing wheels 4, engine 5, clutch 7 and gear box 6. A storage hopper 8 for the dust to be distributed is placed as shown in a position easily accessible for filling purposes and is provided with an agitator 9 driven by the bevel gear 10 driven via shaft 11 through the clutch 7 from the engine.

Referring more particularly to Figs. 7 and 8, it will be seen that the agitator 9 is provided with upper and lower arms. A number of holes 12a are provided in the bottom 12 of the hopper 8 which holes can be partially or completely closed or opened by means of a rotatable plate 13 provided with holes 14 which can be brought into and out of register with the holes 12a in the bottom of the hopper. The plate 13 is rotated by means of an arm 15a actuated through a link from a manually controlled lever 15. The lower arms of the agitator 9 pass closely over the holes 12a in order to push the dust therethrough. A false bottom 9a is provided in the hopper, in order that the feed will be independent of the amount of dust in the hopper.

The hopper is connected by the duct or shute 16 with the fan 17, which is, in turn, connected via the manifold 18, and the conduits 19, 20 and 21 with the booms 22, 23 and 24 respectively, which are provided with a plurality of nozzles 25, 26 and 27 respectively. The downwash of the helicopter, when it is hovering, is indicated by the reference numeral 28.

In operation, the dust is fed from the hopper 8, through a duct 16, into the intake of the fan 17, the amount passing being controlled by the regulating device described. From the fan the dust passes via the manifold 18, into the conduits 19, 20 and 21, and thence emerges through the nozzles 25, 26 and 27 in the booms 22, 23 and 24 into the downwash 28, the booms being so disposed that the dust is distributed across the total width of the downwash.

These booms are preferably arranged in the constriction of the downwash.

Instead of the nozzles in the booms, fish tails, or other types of nozzles could be used, and instead of arranging the three booms, one in front, and one on either side, they can be disposed in any other position, provided they deliver into the downwash.

Referring now to Figs. 4 to 6 of the drawings, the helicopter indicated generally by the reference numeral 29 is provided with a rotor 30, stabilising air-screw 31, landing wheels 32, engine 33, gearbox 34 and clutch 35. A storage tank 36 is provided for a liquid which may contain a solid in suspension in which case an agitator (not shown) will be provided. A delivery pipe 37 connects the storage tank 36 with a pump 38 driven by the engine through the clutch 35 or by a propeller (not shown) rotating in the downwash. The pump has an outlet pipe 39 controlled by the needle valve 40 and this pipe 39 supplies liquid to pipes 41, 42 and 43. The pipes 41, 42 and 43 may be shut off independently by the needle valves 44, 45 and 46. The pipes 41, 42 and 43 supply spray bars 47, 48 and 49 having spray nozzles 50, 51 and 52, respectively which distribute the liquid spray in the downwash. The downwash of the helicopter when it is hovering is indicated by the reference numeral 53. The nozzles are so disposed that the spray is distributed across the total width of the downwash.

Alternatively, an air compressor could be used, providing an air cushion above the liquid in a closed tank, and either hydraulic jets, or jets making use of the fast moving air, could be used for breaking up the liquid.

As can be seen from Figs. 2 and 5, in which the annular portion of the downwash is indicated by dotted circles, the inner limit thereof is about half-way radially outwardly of the axis of rotation of the lifting rotor as compared with the length of the rotor blades, the outer limit being substantially a cylinder the diameter of which corresponds to the outer ends of the rotor blades and the inner limit about one-half the length of said blades. The discharge-means for the material to be sprayed therefore is located a distance outwardly from the axis of rotation of the rotor equivalent to about one-half of the length of the rotor blades, thus placing the point of discharge substantially centrally of the aforementioned annular substantially quiet portion of the downwash produced by the rotor.

In the appended claims, the expression "beneath the helicopter" is to be understood as meaning directly under the helicopter or slightly to the rear, the side or the front of the helicopter.

I claim:

1. A helicopter adapted for the efficient spraying of insecticides and the like which comprises the combination of a fuselage, a bladed lifting rotor affixed thereto and rotatable about a vertical axis to lift the helicopter, a container for material to be sprayed mounted on said fuselage, a conduit connected with said container terminating in discharge-means mounted on said fuselage and located below said rotor radially outwardly from the axis of rotation thereof approximately half the length of the blades of said rotor, and means for regulating the rate of discharge of material through said discharge means.

2. An aerial spraying device as claimed in claim 1, in which the discharge means comprise nozzles for spraying liquid material.

3. An aerial spraying device as claimed in claim 1, in which the discharge means comprise means for discharging powdered material.

4. An aerial spraying device as claimed in claim 1, in which the container for material to be sprayed is a tank having a bottom provided with holes, means for opening and closing said holes, agitators for keeping the material in the tank in suspension, and an intermediate false bottom to maintain the uniformity of feed of said material from said tank irrespective of the amount of material in said tank.

5. An aerial spraying device as claimed in claim 1, in which the container for material to be sprayed is a tank capable of holding liquid, and the means for conveying the material to the discharge means includes a pump.

WALTER EUGENE RIPPER.

REFERENCES CITED

The following references are of record in the file of this patent:

UNITED STATES PATENTS

| Number | Name | Date |
|---|---|---|
| 1,732,406 | Junkers | Oct. 22, 1929 |
| 1,971,734 | Stalker | Aug. 28, 1934 |
| 1,997,669 | Arcieri | Apr. 16, 1935 |
| 2,098,887 | Satterlee | Nov. 9, 1937 |
| 2,318,259 | Sikorsky | May 4, 1943 |

FOREIGN PATENTS

| Number | Country | Date |
|---|---|---|
| 153,063 | Great Britain | Oct. 25, 1920 |